United States Patent
Mashimo

(10) Patent No.: US 9,451,330 B2
(45) Date of Patent: Sep. 20, 2016

(54) PROGRAM RECOMMENDATION DEVICE AND PROGRAM RECOMMENDATION PROGRAM

(71) Applicant: SAMSUNG ELECTRONICS CO., LTD., Suwon-si (KR)

(72) Inventor: Noriya Mashimo, Yokohama-si (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 14/061,083

(22) Filed: Oct. 23, 2013

(65) Prior Publication Data
US 2014/0115635 A1    Apr. 24, 2014

(30) Foreign Application Priority Data

Oct. 23, 2012  (JP) ................................ 2012-233463
Jul. 31, 2013  (KR) ........................ 10-2013-0091168

(51) Int. Cl.
*G06F 3/00* (2006.01)
*H04N 21/482* (2011.01)
*H04N 21/466* (2011.01)

(52) U.S. Cl.
CPC ........ *H04N 21/4828* (2013.01); *H04N 21/466* (2013.01); *H04N 21/4668* (2013.01); *H04N 21/4826* (2013.01)

(58) Field of Classification Search
None
See application file for complete search history.

(56) References Cited

U.S. PATENT DOCUMENTS

| | | | |
|---|---|---|---|
| 9,332,318 B2* | 5/2016 | Li | H04N 21/4828 |
| 2003/0065503 A1* | 4/2003 | Agnihotri | G06F 17/2705 704/7 |
| 2003/0093260 A1* | 5/2003 | Dagtas et al. | 704/1 |
| 2005/0289599 A1* | 12/2005 | Matsuura et al. | 725/53 |
| 2009/0228424 A1 | 9/2009 | Mori et al. | |

(Continued)

FOREIGN PATENT DOCUMENTS

| | | |
|---|---|---|
| JP | 7-143463 A | 6/1995 |
| JP | 2002199294 A | 7/2002 |

(Continued)

OTHER PUBLICATIONS

International Search Report (PCT/ISA/210), dated Feb. 17, 2014, issued by the International Searching Authority in counterpart International Patent Application No. PCT/KR2013/009481.

(Continued)

*Primary Examiner* — Jason K Lin
(74) *Attorney, Agent, or Firm* — Sughrue Mion, PLLC

(57) ABSTRACT

The program recommendation device includes a search term receiver that receives at least one search term designated by a user, a partial match searcher that searches an electronic program list for programs having program information with words and phrases partially matching the search term designated by the user and outputs a partial match search result set, a language analyzer that performs a language analyzing process on the program information of each of the programs contained in the partial match search result set and outputs an analyzed search result set, an exact match searcher that searches the analyzed program information contained in the analyzed search result set for programs with words and phrases exactly matching the search term designated by the user and outputs an exact match search result set. A recommended program display displays programs contained in the exact match search result set as recommended programs.

14 Claims, 6 Drawing Sheets

(56) References Cited

U.S. PATENT DOCUMENTS

| | | |
|---|---|---|
| 2010/0057725 A1 | 3/2010 | Matsumura |
| 2010/0232431 A1* | 9/2010 | Sebastian ............ H04N 7/17318 370/390 |
| 2011/0313775 A1* | 12/2011 | Laligand et al. ............. 704/275 |
| 2012/0266195 A1* | 10/2012 | Nakano et al. ................. 725/53 |

FOREIGN PATENT DOCUMENTS

| | | |
|---|---|---|
| JP | 2004-194107 A | 7/2004 |
| KR | 10-2007-0000751 A | 1/2007 |
| KR | 10-2008-0025461 A | 3/2008 |

OTHER PUBLICATIONS

Written Opinion (PCT/ISA/237), dated Feb. 17, 2014, issued by the International Searching Authority in counterpart International Patent Application No. PCT/KR2013/009481.

Communication dated Apr. 19, 2016 issued by European Patent Office in counterpart European Application No. 13849861.3.

* cited by examiner

PROGRAM RECOMMENDATION DEVICE AND PROGRAM RECOMMENDATION PROGRAM

CROSS-REFERENCE TO RELATED APPLICATIONS

This application claims priority from Japanese Patent Application No. 2012-233463, filed on Oct. 23, 2012, in the Japanese Patent Office, and from Korean Patent Application No. 10-2013-0091168, filed on Jul. 31, 2013, in the Korean Intellectual Property Office, the disclosures of which are incorporated herein by reference in their entireties.

BACKGROUND

1. Field

One or more exemplary embodiments relate to a program recommendation device that recommends a program which is broadcast via broadcast waves and desired to be watched by a user, and a method for recommending a program.

2. Description of the Related Art

Televisions that receive broadcast waves and/or digital versatile disk (DVD) players that record received programs have been known to search for a program desired to be watched by a user, such as, for example, by using an electronic program list. In general, an electronic program list includes detailed program information, such as titles, genres, and/or content of programs.

For example, Patent Document 1 discloses a device which is configured for searching for programs related to a program which a user desires to record. When a user inputs a search term, such as, for example, a title of a program which the user desires to record, the device searches program information included in an electronic program list by using the search term and extracts programs matching the search term and related programs thereof.

According to such searches which are based on the search term designated by the user, programs having different content from the user's intention may be extracted as a search result, because words and phrases including the search term or similar to the search term are contained in the program information. For example, when a search is performed using "Kyoto" as a search term, programs having program information which includes words and phrases such as, for example, "Tokyoto (Tokyo Metropolis)", "Shokyoto (small Kyoto)", and the like, are extracted as a search result. In particular, the search result may include words and phrases obtained by a forward match search and/or a backward match search, in addition to those exactly matching the search term. Thus, the search results may include both desired programs and undesired programs, thereby considerably reducing the accuracy of the search.

The accuracy reduction of the search may be prevented by dividing words and phrases contained in the program information based on parts of speech, and more particularly, by carrying out a language analyzing process, e.g., a Japanese analyzing process, for example, by carrying out a morphological analysis, and then searching for programs by using a search term designated by the user.

PRIOR ART

Patent Document 1: Japanese Patent Laid-Open Publication No. 2002-199294

SUMMARY

However, a language analyzing process may increase a calculation load of a central processing unit (CPU) that controls a device. In general, a morphological analysis is a process of dividing a sentence or clause into words of different parts of speech by using a dictionary. Because the program recommendation device searches for programs using the search term in program information of all broadcasting stations, titles of the programs contained in the program information of all of the broadcasting stations alone may yield an enormous quantity of results. As a result, the calculation load increases.

As the calculation load increases, an increasingly large portion of the capacity of the CPU is occupied by the search operation. Thus, there is a need for a high-performance CPU. By using a high-performance CPU, the program search process may be performed at a high speed without reducing the accuracy of the search while performing other controlling processes. However, the price of the CPU increases, thereby increasing the price of a Blu-ray Disc (BD) recorder. Accordingly, the cost performance of the BD recorder is deteriorated.

One or more exemplary embodiments includes a program recommendation device which is capable of providing a recommended program to a user even by using a simple search term by performing a search at a high speed without reducing the accuracy of the search.

Additional aspects will be set forth in part in the description which follows and, in part, will be apparent from the description, or may be learned by practice of the presented exemplary embodiments.

According to one or more exemplary embodiments, a program recommendation device includes a program which is configured to search an electronic program list for at least one program having program information which matches a received search term based on the search term and outputs a search result set including one or more programs, and a recommended program display which is configured to display at least one program included in the search result set output from the program searcher as a recommended program. The program searcher includes a search term receiver which is configured to receive at least a search term designated by a user, a partial match searcher which is configured to search an electronic program list for at least one program having program information which includes at least one word or one phrase which at least partially matches the received search term, and to output a partial match search result set which includes at least one program, a language analyzer which is configured to perform a language analyzing process with respect to program information of each of the at least one program included in the partial match search result set output from the partial match searcher and to output an analyzed search result set which includes at least one program having analyzed program information, and an exact match searcher which is configured to search for at least one program having at least one word or one phrase which exactly matches the received search term in the analyzed program information included in the analyzed search result set output from the language analyzer, and to output an exact match search result set which includes at least one program. The recommended program display is configured to display at least one of the at least one program included in the exact match search result set output from the exact match searcher as a recommended program.

According to one or more exemplary embodiments, a program recommendation program is provided. The program recommendation program is usable in a program recommendation device which includes a program searcher which is configured to search an electronic program list for at least one program having program information which matches a received search term based on the search term and to output a search result set including at least one program, and a recommended program display which is configured to display at least one program included in the search result set which is output from the program searcher as a recommended program. The program recommendation program is executable by a computer for implementing respective functions of each of the program searcher and the recommended program display. The program searcher includes a search term receiver which is configured to receive a search term designated by a user, a partial match searcher which is configured to search an electronic program list for at least one program having program information which includes at least one word or one phrase which at least partially matches the received search term, a language analyzer which is configured to perform a language analyzing process with respect to the program information of the at least one program searched by the partial match searcher, and an exact match searcher which is configured to search the program information analyzed by the language analyzer for at least one program having program information which includes at least one word or one phrase which exactly matches the received search term. The recommended program display is further configured to display at least one program included in an exact match search result set output from the exact match searcher as a recommended program.

The search term may include words, phrases, and/or text strings.

According to this configuration, when a large quantity of program information which is included in an electronic program list is searched, the partial match searcher is configured to search for programs having program information which includes words and/or phrases at least partially matching the search term designated by the user and to output a partial match search result set, and the language analyzer is configured to perform a language analyzing process only with respect to program information included in the output partial match search result set. Thus, a computational load applied to the language analysis is significantly reduced, as compared to a computational load applied to a language analysis of all program information contained in the electronic program list.

Furthermore, because the exact match searcher is configured to search only for programs having words and phrases exactly matching the search term designated by the user in the analyzed program information contained in an analyzed search result set output from the language analyzer, undesired search results may not be obtained, and in this manner, generation of inadvertent search noise may be prevented.

Thus, a desired program may be searched at a high speed, and manufacturing costs may not be increased, although a high-performance device is not used.

In particular, the language analyzer may be configured to perform a morphological analysis.

In order to improve accuracy of the search by reflecting a user's intention, the program recommendation device may further include a viewing log analyzer which is configured to generate a relevant search term which relates to the received search term by using a past history of viewing of the user, and the search term receiver may be configured to receive both of the search term designated by the user and the generated relevant search term.

In order to improve the relation between the search term designated by the user and the relevant search term, the viewing log analyzer may include a count accumulator which is configured to determine a number of occurrences of each of words, phrases, and text strings which are included in the program information of a viewed program according to categories of program information of programs, an occurrence coefficient setter which is configured to set an occurrence coefficient based on a respective coefficient of each corresponding category and the number of occurrences of each of the words, phrases, and text strings determined by the count accumulator on a per category basis, and a relevant search term generator which is configured to generate a relevant search term which relates to the received search term based on the occurrence coefficient.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
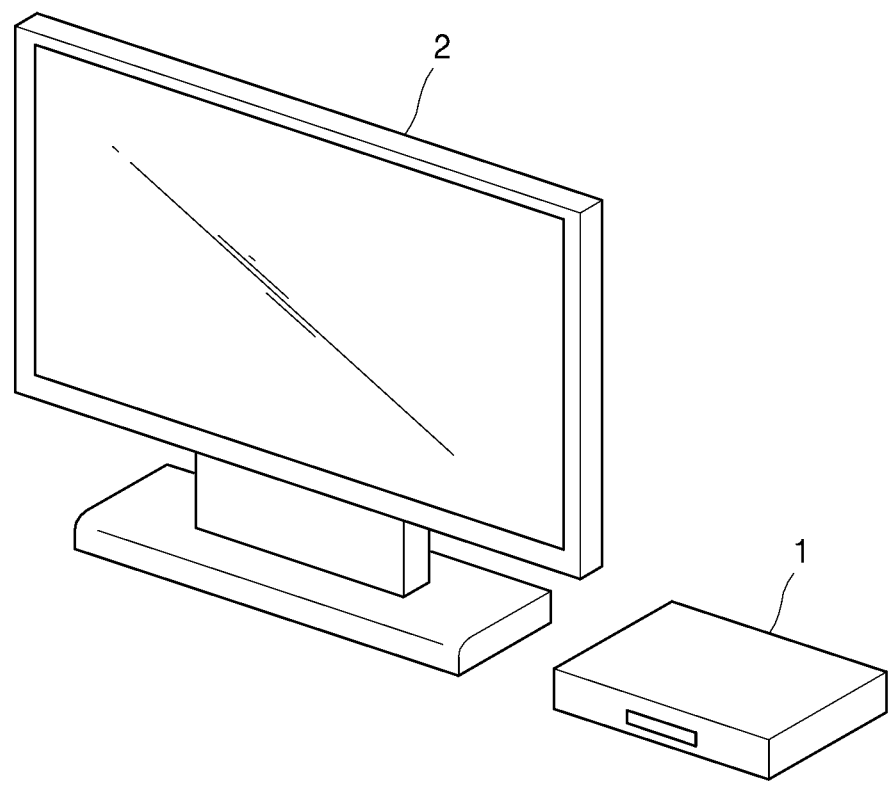
FIG. 1 is a perspective view which illustrates a Blu-ray Disc (BD) recorder and a television provided with a device, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

A program recommendation device according to an exemplary embodiment may be implemented as a separate device, such as, for example, a set-top box having a recording function, or may be embedded in a television (TV).

When a keyword corresponding to a voice or text is entered by a user, the program recommendation device performs a primary search for programs partially matching the keyword, performs a secondary search for programs exactly matching the keyword based on the programs partially matching the keyword, and displays the results of the primary search and/or the secondary search on a screen. In this regard, when program information obtained by the primary search is expressed in a different language from a currently set language, the program recommendation device translates the program information into the currently set language, and then performs the secondary search. Conversely, when the program information obtained by the primary search is in the same language as the currently set language, the secondary search is immediately performed based on the results of the primary search.

Thus, the program recommendation device may more accurately and efficiently recommend a desirable-to-watch program to the user.

Figure 2:
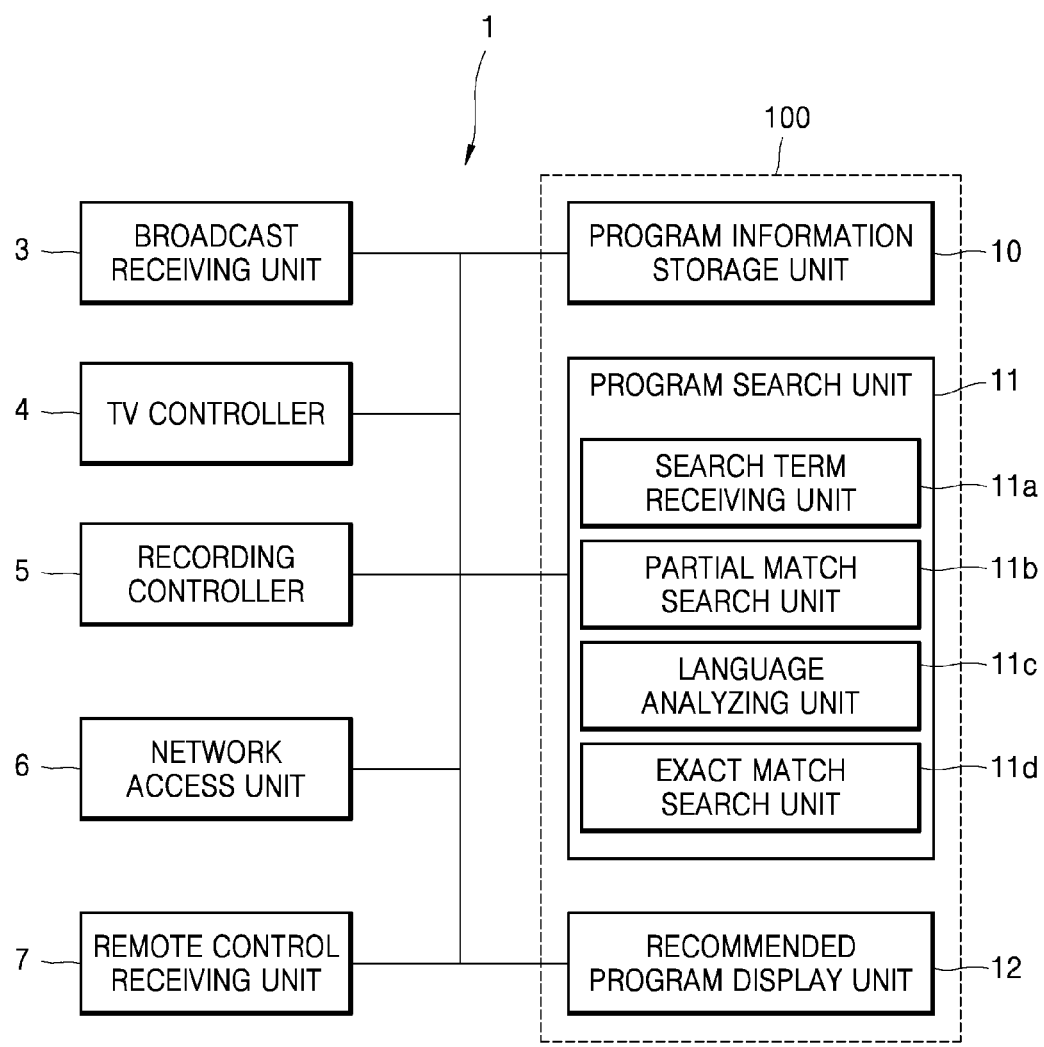
FIG. 2 is a functional block diagram according to the exemplary embodiment of FIG. 1.

A Blu-ray Disc (BD) recorder 1 illustrated in FIG. 1 includes a program recommendation device 100 according to an exemplary embodiment. The BD recorder 1 that receives broadcast waves and records a variety of programs is connected to a TV 2. Referring to FIG. 2, the BD recorder 1 includes the program recommendation device 100, a broadcast receiving unit (also referred to herein as a "broadcast receiver") 3 that receives broadcast waves, a TV controller 4 that controls image signals which are output to the TV, a recording controller 5 that controls schedule recording or dubbing of a program which is recorded in a hard disk in the BD recorder 1, a network access unit (also referred to herein as a "network interface") 6 that controls access to a server which stores an electronic program list via the Internet, and a remote control receiving unit (also referred to herein as a "remote control receiver") 7 that receives various signals which are transmitted from a remote control.

The BD recorder 1 includes hardware, such as, for example, a central processing unit (CPU), a memory, a hard disk, and an I/O interface, and executes a program which is stored in the memory in order to perform functions of the broadcast receiving unit 3, the TV controller 4, the recording controller 5, the network access unit 6, and the remote control receiving unit 7, and functions of the program recommendation device 100. The broadcast receiving unit 3, the TV controller 4, the recording controller 5, the network access unit 6, and the remote control receiving unit 7 are well known in the art, and thus a detailed description thereof is not given.

The program recommendation device 100 includes a program information storage unit (also referred to herein as a "program information storage") 10, a program search unit (also referred to herein as a "program searcher") 11, and a recommended program display unit (also referred to herein as a "recommended program display") 12. The program search unit 11 includes a search term receiving unit (also referred to herein as a "search term receiver") 11a, a partial match search unit (also referred to herein as a "partial match searcher") 11b, a language analyzing unit (also referred to herein as a "language analyzer") 11c, and an exact match search unit (also referred to herein as an "exact match searcher") 11d.

The program information storage unit 10 stores program information contained in the electronic program guide (EPG) which is provided via broadcast waves or via the Internet. The electronic program list may include any one or more of an EPG, an interactive program guide (IPG), and the like. The electronic program list includes information which relates to programs broadcasting stations, such as, for example, all programs scheduled to air each day. For example, the program information includes basic program information and detailed program information. The basic program information includes any one or more of a title of a program, a brief introduction of the program, a category (genre) of the program, and the like, and the detailed program information includes any one or more of content of the program, names of performers, and the like.

The search term receiving unit 11a receives a search term which is input by a user via manipulation of a remote control. The search term designated by the user and input via manipulation of the remote control is transmitted from the remote control and received by the remote control receiving unit 7. As the remote control receiving unit 7 transmits the received search term to the search term receiving unit 11a, the search term receiving unit 11a receives the search term.

The partial match search unit 11b searches for words and phrases which at least partially match the search term received by the search term receiving unit 11a in program information stored in the program information storage unit 10. Based on the search result, a partial search result set including one or more programs is output. The search term may include, for example, a word, but may also include one or more phrases and/or a text string. For example, the search term may include a word, phrase, and/or text string indicating the title or genre of programs contained in the basic program information, and/or characteristics of the content of programs contained in the detailed program information. According to the partial match search, words, phrases, and/or text strings matching the search term are detected from a text string of the program information regardless of locations thereof. Upon comparison between the search term and a text string, a text string partially matching the search term may be extracted as a search result.

The language analyzing unit 11c performs a language analyzing process, for example, a morphological analysis, with respect to the program information of the programs contained in the partial match search result set output from the partial match search unit 11b and the search term. Then, the language analyzing unit 11c outputs an analyzed search result set which includes one or more programs having analyzed program information. By performing the morphological analysis, the program information of the programs contained in the partial match search result set may be searched on the basis of parts of speech. According to an exemplary embodiment, the language analyzing unit 11c may translate and analyze the program information of the programs and/or the search term into a language selected by the user. According to another exemplary embodiment, the language analyzing unit 11c may translate and analyze the program information into a language of a country where the program is produced by using country information which relates to the program. In particular, the country information which relates to the program may be detected by using an IP address. According to another exemplary embodiment, when the program information is dubbed in another language, the language analyzing unit 11c may translate and analyze the program information and the search term into the original language of a country where the program is produced.

The exact match search unit 11d searches for programs which include words and phrases exactly matching the search term designated by the user in the analyzed program information of the programs contained in the analyzed search result set output by the language analyzing unit 11c, and outputs an exact match search result set including one or more programs based on the exact match search result. Thus, the exact match search result set includes one or more programs including the search term designated by the user in the program information thereof. Words, phrases, or text strings which have the same number of characters and the same combination of the characters as the search term, are identified as a result of the exact match search.

The recommended program display unit 12 displays at least one of the programs contained in the exact match search result set output by the exact match search unit 11d on a screen of the TV 2 connected to the BD recorder 1. When the size of the TV 2 is sufficiently large, or the exact match search result set has a small number of programs, all of the programs may be displayed on the screen of the TV 2.

Figure 3:
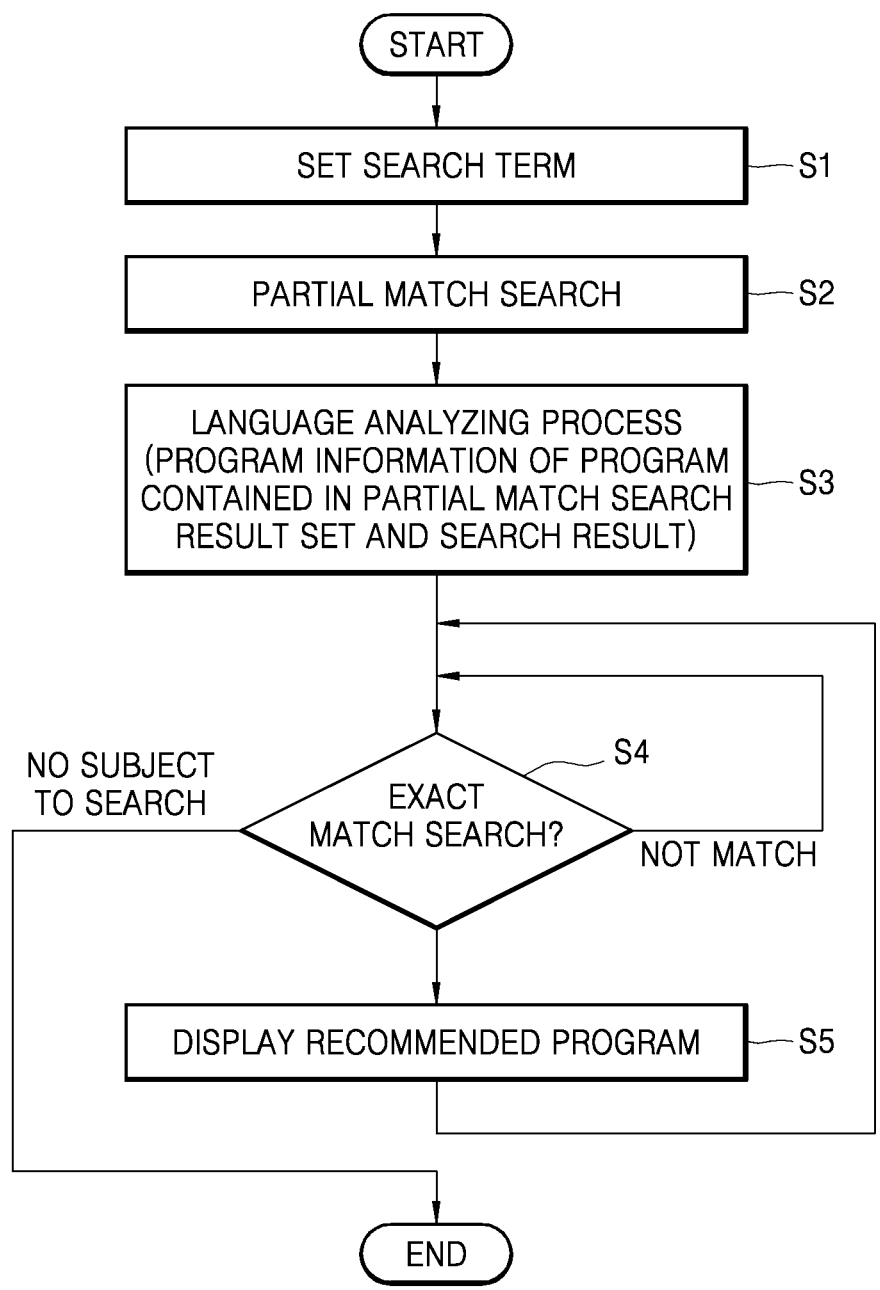
FIG. 3 is a flowchart which illustrates a control procedure, according to the exemplary embodiment of FIG. 1.

In the aforementioned configuration, a procedure for performing the search by using the search term selected by the user will be described with reference to FIG. 3. In addition, before starting the search, the program information storage unit 10 stores, for example, program information which is acquired from program-specific information/service information (PSI/SI) which is contained in broadcast waves. Alternatively, the program information storage unit 10 may store program information received from an external server via the network access unit 6.

First, in operation S1, the search term is designated, i.e., set, by the user via manipulation of the remote control. The search term is transmitted from the remote control and received by the search term receiving unit 11a via the remote control receiving unit 7.

Then, in operation S2, the partial match search unit 11b searches for programs having program information with words and/or phrases which at least partially match the search term received by the search term receiving unit 11a, and generates a partial match search result set including programs corresponding to the program information having words, phrases, and/or text strings partially matching the search term. Then, the partial match search unit 11b outputs the partial match search result set to the language analyzing unit 11c.

In operation S3, the language analyzing unit 11c performs a language analyzing process, e.g., a Japanese analyzing process, with respect to the program information which relates to the programs contained in the partial match search result set obtained by the partial match search performed by the partial match search unit 11b, and the search term, and generates an analyzed search result set that includes analyzed program information. Then, the language analyzing unit 11c outputs the analyzed search result set to the exact match search unit 11d. The language analyzing process is performed not on all of the program information stored in the program information storage unit 10, but instead only with respect to the program information of programs contained in the partial match search result set. Thus, the language analyzing process, e.g., the Japanese analyzing process, may be performed with respect to a relatively smaller amount of the program information, as compared to all of the program information.

In operation S4, the exact match search unit 11d performs an exact match search for words, phrases, and/or strings which exactly match the search term, in the program information which relates to the programs contained in the analyzed search result set obtained by performing the language analysis process. When the analyzed search result set does not include programs having program information with words, phrases, or text strings which exactly match the search term, i.e., when there is no exact match search result, the search is ended. Otherwise, when the analyzed search result set includes programs having program information with words, phrases, or text strings exactly matching the search term, an exact match search result set including one or more programs having the analyzed program information is generated. Then, the exact match search unit 11d outputs the exact match search result set to the recommended program display unit 12. In operation S5, the recommended program display unit 12 displays at least one of the programs contained in the exact match search result set on a screen of the TV 2 based on pre-set standards. Accordingly, recommended programs are provided to the user.

According to the search using the search term as described above, the partial match search unit 11b searches program information which partially matches the search term, and then the language analyzing unit 11c performs a language analyzing process only with respect to program information which relates to the programs contained in the partial match search result set acquired as a result of the partial match search. Thus, the quantity of program information subjected to the language analyzing process is extremely reduced, as compared to the quantity of all of the program information. In this manner, the calculation load of the CPU may be dramatically reduced. Accordingly, there is no need to use a high-performance CPU, and manufacturing costs thereof may not be increased.

In addition, because the exact match search unit 11d performs an exact match search only for the language-analyzed program information, programs which have program information similar to the search term but undesired to be watched by the user may be excluded, thereby improving the accuracy of the search.

Furthermore, because the number of programs subjected to the search, i.e., the exact match search, is reduced by the partial match search, an overall search may be performed at a high speed. In addition, because programs subjected to a language analyzing process are searched for using the search term designated by the user instead of simply selecting programs, a sufficient search may be performed at a high speed.

Another exemplary embodiment will be described below.

Figure 4:
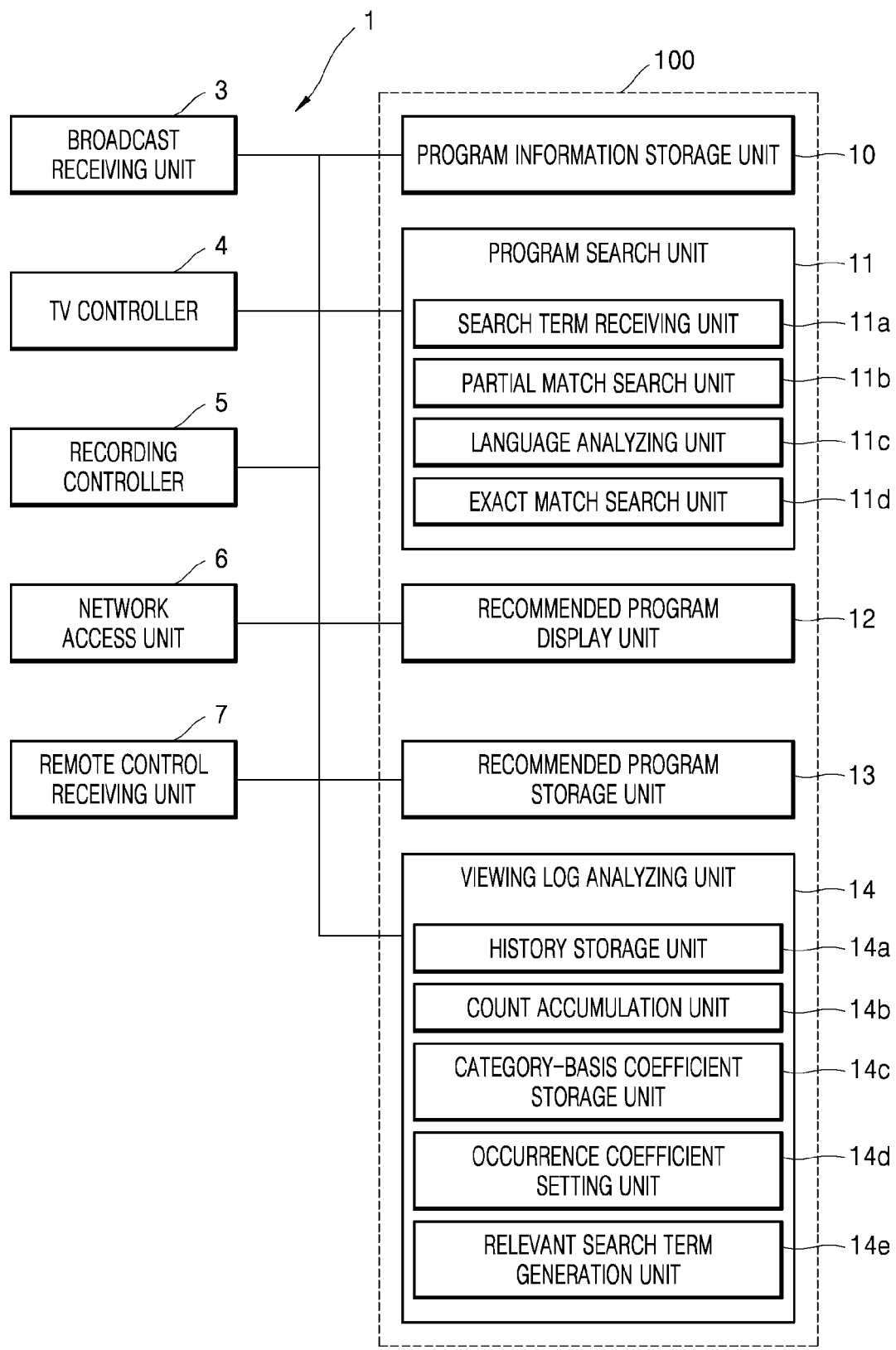
FIG. 4 is a functional block diagram, according to another exemplary embodiment.

According to another exemplary embodiment, the program recommendation device 1 may further include a recommended program storage unit (also referred to herein as a "recommended program storage") 13 and a viewing log analyzing unit (also referred to herein as a "viewing log analyzer") 14, as illustrated in FIG. 4. In addition, the search term receiving unit 11a receives both a search term designated by the user and a relevant search term, which will be described below.

When the user performs a search for programs, the recommended program storage unit 13 stores programs which are included in the exact match search result set as recommended programs, and simultaneously stores a search term table in which program information which relates to each of the recommended programs is related to the search term designated by the user when the recommended programs are extracted.

The viewing log analyzing unit 14 generates a relevant search term that is related to the search term designated by the user by using a past history of viewings of the user, i.e., the viewing log analyzing function when the user records the recommended program, when the user reproduces the recorded program, or when the recommended program is scheduled to be viewed. Hereinafter, a detailed example of the viewing log analyzing unit 14 will be described. According to the current exemplary embodiment, based on the search term designated by the user, the program information is classified into categories which relate to the title and genre of program, which are basic program information, and detailed program information, and a relevant search term is generated on a per classified category basis.

The viewing log analyzing unit 14 includes a history storage unit (also referred to herein as a "history database") 14a that stores a viewing history, a count accumulation unit (also referred to herein as a "count accumulator") 14b that accumulates and/or determines a number of occurrences of each of the words, phrases, and/or text strings contained in program information of programs viewed by the user on a per classified category basis, a category-basis coefficient storage unit (also referred to herein as a "category-basis coefficient database") 14c that stores each coefficient of each of the categories set according to the title of the program, which is necessarily contained in the program information, the genre of the program, and the detailed program information, an occurrence coefficient setting unit (also referred to herein as an "occurrence coefficient setter") 14d that sets an occurrence coefficient based on the coefficient of each category and the number of occurrences of each of the words, phrases, and/or text strings accumulated by the count accumulation unit 14b on a per category basis, and a relevant search term generation unit (also referred to herein as a "relevant search term generator") 14e that generates a relevant search term which relates to each of the search terms based on the respective occurrence coefficient thereof.

The history storage unit 14a stores information that the recommended program was recorded, information that the recorded recommended program was reproduced, information that the recommended program was viewed, and/or information that the recommended program was scheduled to view, in relation to the program information of each recommended program.

The count accumulation unit 14b accumulates and/or determines the number of occurrences of a relevant search term candidate having words, phrases, and/or text strings contained in the program information of the reproduced program when the user reproduces the recorded program, in relation respectively to any one or more of the title of the program, the genre of the program, and the detailed program information.

The category-basis coefficient storage unit 14c stores category-basis coefficients which are set based on frequencies of the relevant search term candidate used for each of the searches of the title of the program, the genre of the program, and the detailed program information, which are categories of the program information. According to the current exemplary embodiment, a coefficient of program title ($\alpha$), a coefficient of program genre ($\beta$), and a coefficient of detailed program information ($\zeta$) are set as the category-basis coefficients. As the frequency of the category including the relevant search term candidate increases, a greater coefficient is set. In particular, when the frequency of the relevant search term candidate contained in the detailed program information is relatively high, the coefficient of the detailed program information ($\zeta$) is relatively greater than the other coefficients.

The occurrence coefficient setting unit 14d calculates the occurrence coefficient by multiplying the category-basis coefficient stored in the category-basis coefficient storage unit 14c by the number of occurrences counted by the count accumulation unit 14b. In particular, the occurrence coefficient may be calculated by using the following formula:

> Occurrence coefficient=Number of occurrences of relevant search term candidate in program title× coefficient of program title($\alpha$)+Number of occurrences of relevant search term candidate in program genre×coefficient of program genre($\beta$)+ Number of occurrences of relevant search term candidate in detailed program information×coefficient of detailed program information($\zeta$).

The relevant search term generation unit 14e generates a relevant search term according to each search term designated by the user. A relevant search term candidate having an occurrence coefficient, which is calculated by using the above formula and greater than a reference value, is generated as the relevant search term corresponding to the search term designated by the user.

Figure 5:
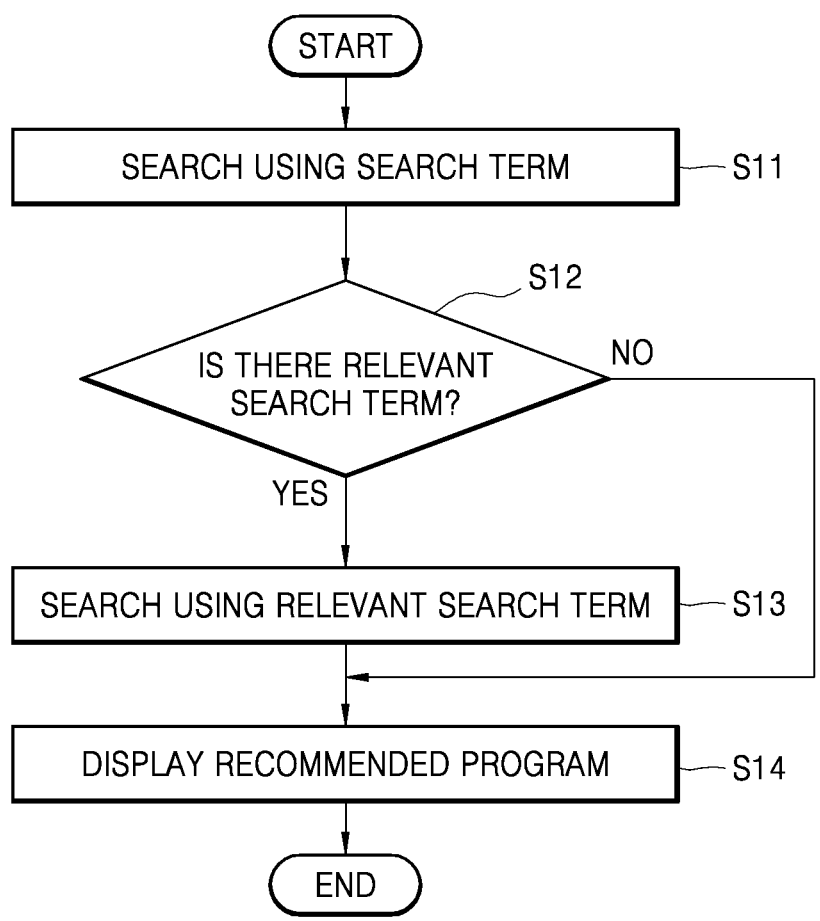
FIG. 5 is a flowchart which illustrates a control procedure according to the exemplary embodiment of FIG. 4.
Figure 6:
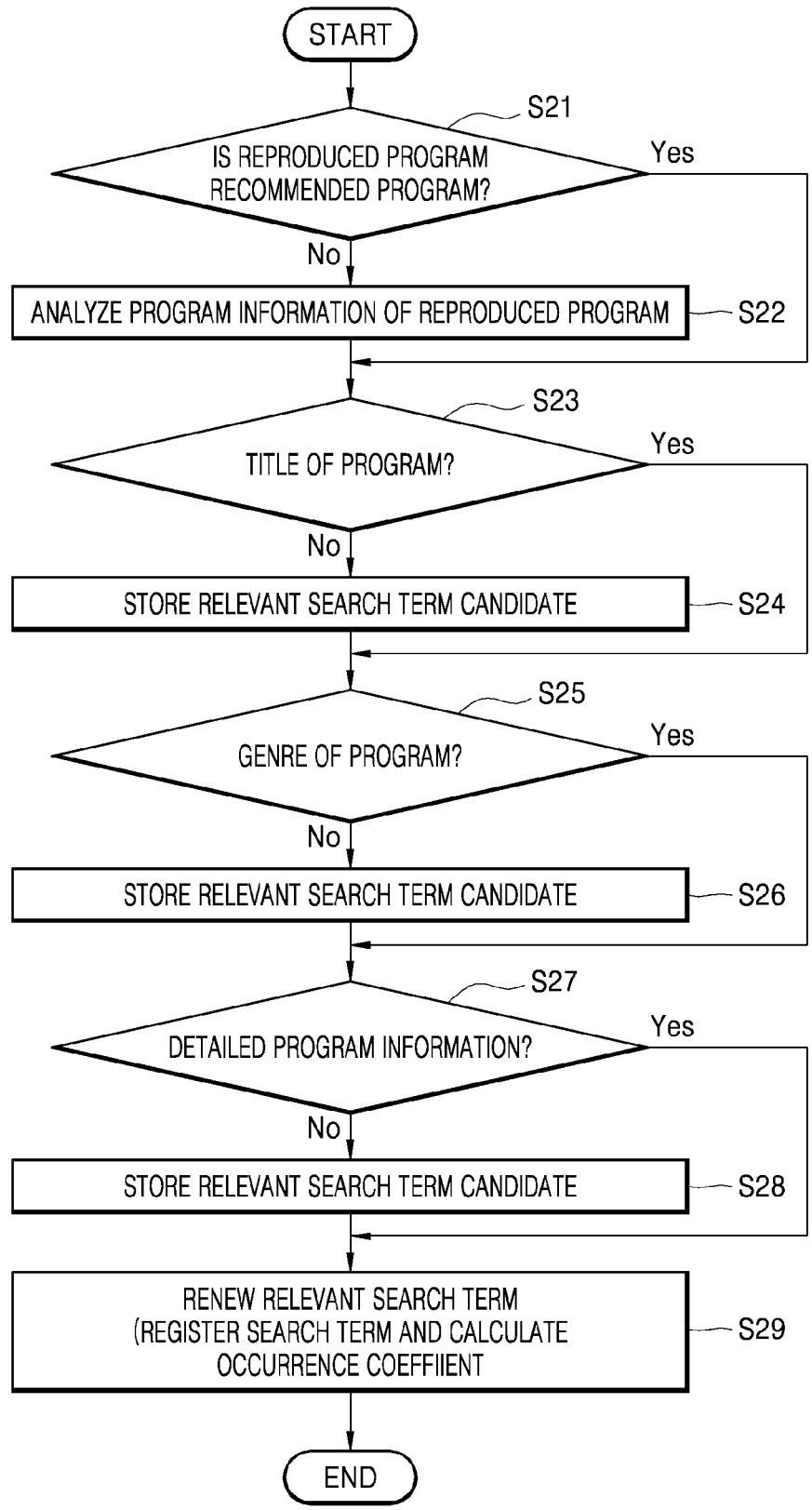
FIG. 6 is a flowchart which illustrates a control procedure according to the exemplary embodiment of FIG. 4.

A procedure for recommending the program and a procedure for generating the relevant search term will be described with reference to FIGS. 5 and 6.

First, the procedure for recommending programs further by using the relevant search term will be described. In operation S11, a search using the search term designated by the user is performed. The search is the same as that of the previous exemplary embodiment. In particular, operation S11 is performed by carrying out operations S1, S2, S3, S4, and S5 as illustrated in FIG. 3.

Then, in operation S12, a determination is made as to whether there is a relevant search term. In particular, when the viewing log analyzing unit 14 outputs the generated relevant search term to the search term receiving unit 11a, a determination is made that there is a relevant search term.

When a determination is made that there is a relevant search term, a search using the relevant search term is performed in operation S13. In this case, the search using the relevant search term is identical to the search using the search term designated by the user. First, the partial match search unit 11b performs a partial match search using the relevant search term. Then, the language analyzing unit 11c performs a language analyzing process with respect to program information which relates to programs contained in a partial match search result set obtained by the partial match search using the relevant search term. The exact match search unit 11d performs an exact match search using the relevant search term in the analyzed program information which relates to programs contained in an analyzed search result set.

In operation S14, both of the recommended programs obtained by the search using the search term designated by the user and the recommended programs obtained by the search using the relevant search term are stored in the recommended program storage unit 13 as recommended programs and displayed on the recommended program display unit 12.

As described above, when there is a relevant search term, the partial match search, the language analysis, and the exact match search are performed by using both of the search term designated by the user and the relevant search term, thereby extracting the recommended programs.

Hereinafter, the generation of the relevant search term will be described with reference to FIG. 6.

First, in operation S21, the viewing log analyzing unit 14 determines, for example, whether a reproduced program is a recommended program stored in the recommended program storage unit 13. As a result of the determination, when the reproduced program is not a recommended program, the language analyzing process is performed with respect to the program information of the reproduced program in operation S22.

In operation S23, the count accumulation unit 14b determines whether a relevant search term candidate having words and phrases contained in the analyzed program information occurs in the title of the program. As a result of the determination, when the relevant search term candidate occurs in the title of the program, the count accumulation unit 14b accumulates and/or determines the number of occurrences of each relevant search term candidate in the title of the program and updates the number of occurrences. Otherwise, when the relevant search term candidate does not occur in the title of the program, the count accumulation unit 14b maintains the number of occurrences of each relevant search term candidate in the current title of the program and proceeds to a next stage. In addition, words and phrases occurring in the title of the program for the first time are stored in the relevant search term generation unit 14e as relevant search term candidates in operation S24.

Then, in operation S25, the count accumulation unit 14b determines whether the relevant search term candidate occurs in the genre of the program. As a result of the determination, when the relevant search term candidate occurs in the genre of the program, the count accumulation unit 14b accumulates and/or determines the number of occurrences of each relevant search term candidate in the genre of the program and updates the number of occurrences. Otherwise, when the relevant search term candidate does not occur in the genre of the program, the count accumulation unit 14b maintains the number of occurrences of each relevant search term candidate in the current genre of the program and proceeds to a next stage. In addition, words and phrases occurring in the genre of the program for the first time are stored in the relevant search term generation unit 14e as relevant search term candidates in operation S26.

Furthermore, in operation S27, the count accumulation unit 14b determines whether the relevant search term candidate occurs in the detailed program information. As a result of the determination, when the relevant search term candidate occurs in the detailed program information, the count accumulation unit 14b accumulates and/or determines the number of occurrences of each relevant search term candidate in the detailed program information and updates the number of occurrences. In addition, words and phrases occurring in the detailed program information for the first time are stored in the relevant search term generation unit 14e as relevant search term candidates in operation S28.

Then, in operation S29, the relevant search term generation unit 14e calculates an occurrence coefficient of each relevant search term candidate extracted at that point by using the above formula based on the number of occurrences of the relevant search term candidate respectively in the title of the program, the genre of the program, and the detailed program information accumulated in the count accumulation unit 14b and based on each of the coefficients, as weights, of the title of the program, the genre of the program, and the detailed program information stored in the category-basis coefficient storage unit 14c. The relevant search term is updated and registered based on the occurrence coefficient thereof.

In particular, for the updating and registration of the relevant search term, the relevant search term generation unit 14e calculates the occurrence coefficient of each relevant search term by using the above formula and updates and registers a relevant search term candidate having a calculated occurrence coefficient greater than a reference value as the relevant search term.

When the reproduced program is a recommended program, the relevant search term candidate is registered as the relevant search term of the search term designated by the user which is used during a search for the recommended program. In this regard, when the reproduced program is not a recommended program, there is no relevant search term. Thus, a relevant search term is generated in consideration of the past viewing history during a next search.

According to the above configuration, generation of the relevant search term is determined by using the occurrence coefficient based on the number of occurrences in the program information which relates to the recommended program reproduced by the user by setting different coefficients for categories of program information relating to broadcasting programs, i.e., by applying different weights to the categories. Accordingly, the relation between the search term designated by the user and the relevant search term may be increased. Thus, a user's tendency or preference for programs may be applied to the recommended program.

In addition, because programs are searched for in conjunction with the search which is performed by using the search term designated by the user when the relevant search term is generated, undesired programs may be excluded without increasing a search load of the CPU, and the speed and accuracy of the search may be increased.

However, exemplary embodiments according to the present inventive concept are not limited thereto.

According to exemplary embodiments, the language analyzing unit 11c performs a morphological analysis. However, for example, N-gram analysis, or signature analysis may also be used for the language analysis. In addition, the program recommendation function according to one or more exemplary embodiments may also be applied to a conventional BD recorder as a sub function by using a program which implements the functions of the program recommendation device according to one or more exemplary embodiments or a transitory or non-transitory recording medium storing the program. Furthermore, although the program recommendation device may be employed in the BD recorder as a device which is configured to perform a sub function according to one or more exemplary embodiments, the program recommendation device may also be employed in a TV, a PC, or the like. The program recommendation device may also be used as a single device without being installed in those products.

As described above, according to the program recommendation device of one or more of the above exemplary embodiments, programs may be recommended with high accuracy from a search result, thereby satisfying a user's intention even by using a relatively simple search term.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present inventive concept as defined by the following claims.

What is claimed is:

1. A program recommendation device comprising:
a memory; and
a processor coupled to the memory, wherein the processor comprises:
a search term receiver which is configured to receive a search term designated by a user;
a partial match searcher which is configured to search an electronic program list for at least one program having program information which includes at least one word or one phrase which at least partially matches the received search term, and to output a partial match search result set based on a result of the search;
a language analyzer which is configured to translate the designated search term and the program information of each of the at least one program included in the partial match search result set into a language of a country where the at least one program is produced based on country information which relates to the at least one program, and to output an analyzed search result set; and an exact match searcher which is configured to search the analyzed search result set for at least one program having program information which includes at least one word or one phrase which exactly matches the translated search term, and to output an exact match search result set based on a result of the search, wherein the at least one program included in the exact match search result set is displayed on a display as a recommended program.

2. The program recommendation device of claim 1, wherein each of the partial match search result set, the analyzed search result set, and the exact match search result set respectively comprises at least one program.

3. The program recommendation device of claim 1, wherein the processor further comprises a viewing log analyzer which is configured to generate a relevant search term which relates to the received search term by using a past history of viewings of the user, wherein the search term receiver is further configured to receive the search term designated by the user and the generated relevant search term.

4. The program recommendation device of claim 3, wherein the viewing log analyzer comprises a count accumulator which is configured to determine a number of occurrences of each of words, phrases, and text strings included in program information of a viewed program according to respective categories of the program information of programs, an occurrence coefficient setter which is configured to set an occurrence coefficient based on a respective coefficient of each corresponding category and the number of occurrences of each of the words, phrases, and text strings determined by the count accumulator on a per category basis, and a relevant search term generator which is configured to generate a relevant search term which relates to the received search term based on the occurrence coefficient.

5. A method for generating a recommendation which relates to a program, the method comprising:

receiving a search term designated by a user;

searching an electronic program list for at least one program having program information which includes at least one word or one phrase which at least partially matches the received search term, and outputting a partial match search result set based on a result of the search;

performing a language analyzing process to translate the designated search term and the program information of each of the at least one program included in the partial match search result set into a language of a country where the at least one program is produced based on country information which relates to the at least one program, and outputting an analyzed search result set; and searching the analyzed search result set for at least one program having program information which includes at least one word or one phrase which exactly matches the translated search term, and outputting an exact match search result set based on a result of the search, wherein the at least one program included in the exact match search result set is displayed on a screen as a recommended program.

6. The method of claim 5, wherein each of the partial match search result set, the analyzed search result set, and the exact match search result set respectively comprises at least one program.

7. The method of claim 5, further comprising generating a relevant search term which relates to the received search term by using a past history of viewings of the user, wherein the receiving the search term designated by the user further comprises receiving the generated relevant search term.

8. The method of claim 7, wherein the generating the relevant search term comprises determining a number of occurrences of each of words, phrases, and text strings included in program information of a viewed program according to respective categories of the program information of programs, and setting an occurrence coefficient based on a respective coefficient of each corresponding category and the determined accumulated number of occurrences of each of the words, phrases, and text strings on a per category basis, and generating a relevant search term which relates to the received search term based on the occurrence coefficient.

9. A non-transitory computer readable recording medium having recorded thereon a program recommendation program which is usable in a program recommendation device which comprises a program searcher which is configured to search an electronic program list for at least one program having program information which at least partially matches a received search term based on the search term and to output a search result set comprising at least one program, and a recommended program display which is configured to display at least one program included in the search result set which is output from the program searcher as a recommended program, wherein the program recommendation program is executable by a computer for implementing respective functions of each of the program searcher and the recommended program display, wherein the program searcher comprises a search term receiver which is configured to receive a search term designated by a user, a partial match searcher which is configured to search an electronic program list for at least one program having program information which includes at least one word or one phrase which at least partially matches the received search term, a language analyzer which is configured to translate the designated search term and the program information of the at least one program searched by the partial match searcher into a language of a country where the at least one program is produced based on country information which relates to the at least one program, and an exact match searcher which is configured to search the program information analyzed by the language analyzer for at least one program having program information which includes at least one word or one phrase which exactly matches the translated search term, and wherein the recommended program display is further configured to display at least one program included in an exact match search result set output from the exact match searcher as a recommended program.

10. A method for generating a recommendation which relates to a program, the method comprising:

identifying a plurality of programs from an electronic program list based on a search term which is designated by a user;

analyzing information by translating the designated search term and the plurality of programs identified based on the designated search term into a language of a country where the program is produced based on country information which relates to the program;

performing a search of a result of the analyzing in order to determine at least one program which exactly matches the translated search term; and displaying the determined at least one program on a screen as a recommendation, wherein the program information which relates to each of the plurality of programs includes at least one of a program title, a program genre, and a program content description.

11. The method of claim 10, wherein the analyzing comprises performing a morphological analysis with respect to the information which relates to each of the plurality of programs.

12. The method of claim 10, further comprising generating a relevant search term based on a past history of viewings of the user, wherein the identifying comprises identifying the plurality of programs from the electronic program list based on both of the search term which is designated by the user and the generated relevant search term.

13. The method of claim 12, wherein the generating the relevant search term comprises:

counting, on a per category basis, a total number of occurrences of words, phrases, and text strings included in program information relating to the past history of viewings by the user; and using a result of the counting to generate the relevant search term.

14. The program recommendation device of claim 1, wherein the language analyzer is further configured to perform a morphological analysis.

* * * * *